C. H. FRITSCHE.
STEERING WHEEL LOCK.
APPLICATION FILED MAR. 5, 1914.
1,112,782.
Patented Oct. 6, 1914.
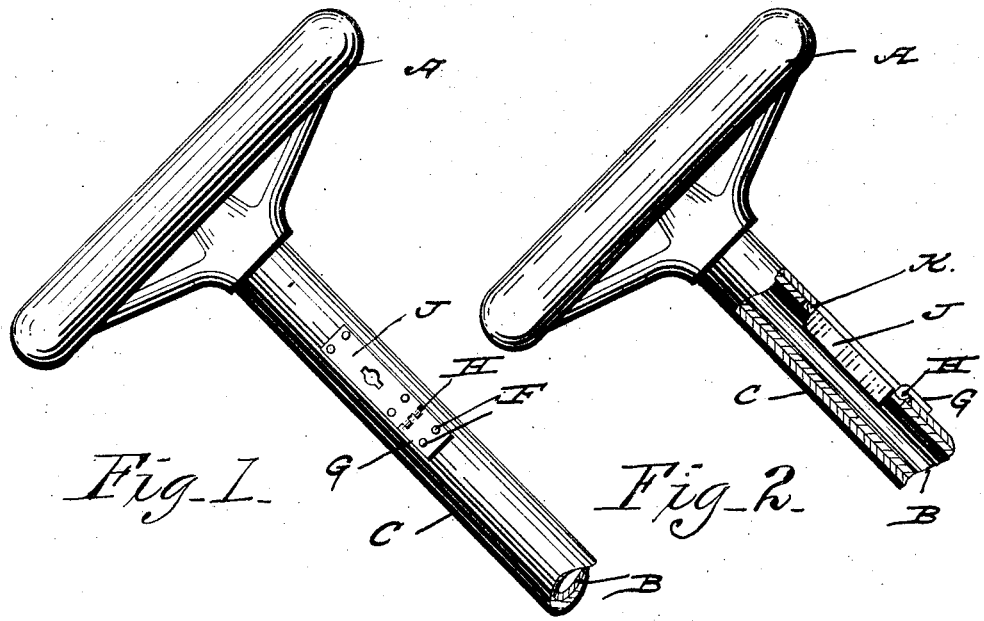
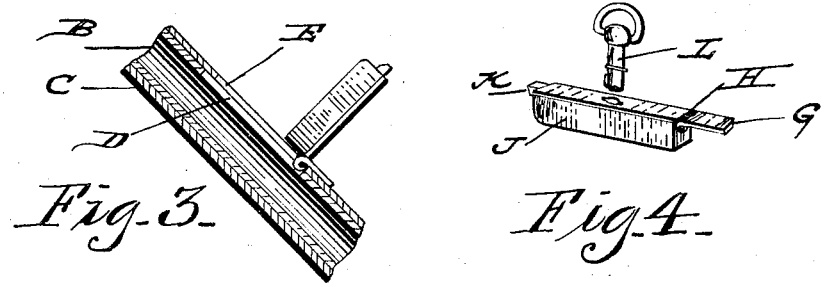

UNITED STATES PATENT OFFICE.

CHESTER HENRY FRITSCHE, OF LOS ANGELES, CALIFORNIA.

STEERING-WHEEL LOCK.

1,112,782.  Specification of Letters Patent.  Patented Oct. 6, 1914.

Application filed March 5, 1914. Serial No. 822,559.

*To all whom it may concern:*

Be it known that I, CHESTER HENRY FRITSCHE, a citizen of the United States, residing at Los Angeles, in the county of Los Angeles and State of California, have invented certain new and useful Improvements in Steering-Wheel Locks, of which the following is a specification.

My invention relates to improvements in steering wheel locks and the leading object of the invention is the provision of means which will positively prevent the improper use or theft of the vehicle or automobile with which the device is attached.

Another object of my invention is the provision of a lock which will be applied to the steering rod casing and which will lock the steering rod and which will not in the least interfere with its proper function or mar or detract from the appearance of the steering rod or casing.

Another object of of my invention is the provision of means which can be applied with ease and at a very small cost and which will be thoroughly efficient for the intended purposes and entirely practical in every particular.

With these objects in view, my invention consists of a steering wheel lock embodying novel features of construction and combination of parts, substantially as shown, described and claimed.

Figure 1 represents a side elevation of a steering wheel and tube or casing provided with my locking mechanism, the parts being in the position they occupy when the steering wheel is locked. Fig. 2 represents a view partly in elevation and partly in section, showing the parts in locked position. Fig. 3 represents a sectional view of the steering wheel casing or tube, and the steering rod, with the locking mechanism thrown out of use, or in unlocked position, and Fig. 4 represents a perspective view of the locking mechanism removed.

The letter A designates the steering wheel, to which is connected the tubular steering rod B, which fits in the tubular casing C, the steering rod being provided with an elongated opening D, which is adapted to aline or register with the elongated opening E, of the tubular casing C. The openings of the rod and casing are of the same width, but the opening of the steering rod is somewhat longer than that of the casing, and to the casing adjacent one end of the opening is secured by fastenings F, the ear or lug G, which is hinged at H, to the lock casing J, which is provided with the catch K, operated by a suitable key L, and adapted to form a locking engagement between the openings D and E, and between the steering rod and casing, as clearly shown in Fig. 2.

When the machine is in use the lock is thrown back upon its hinge, as shown in Fig. 3, which permits of the ready turning of the steering wheel with its rod, but when necessary to lock the steering rod in its casing, the lock is thrown into the alined openings of the rod and casing as shown in Fig. 2, locking the steering rod to the casing and absolutely preventing the turning of the wheel, as will be readily understood. The lock is released by the insertion of the key, and the withdrawal of the catch K, and locked automatically when thrown into the openings D and E, as is evident. It will be seen that the slots of the casing and steering bar register or aline and that the slot of the casing is shorter than that of the bar to form a keeper at one end of the slots, which keeper is engaged by the spring catch in the lock casing, which construction is of great importance.

I claim:

In combination with the steering rod having a slot, an inclosing casing having a short slot communicating with the slot of the rod to allow one edge of the walls of said slots to form a keeper, a plate secured to the wall of the casing at one end of its slot, a lock casing hinged at one end to said plate and adapted to fit in the opening formed by said slots to retain the casing and rod, and a spring catch in said casing to engage the keeper at the other end of said slots to secure the rod and casing together.

In testimony whereof I affix my signature in presence of two witnesses.

CHESTER HENRY FRITSCHE.

Witnesses:
 VILEDA HYDE,
 R. E. KITCHING.